(12) United States Patent
Ma et al.

(10) Patent No.: US 6,304,986 B1
(45) Date of Patent: Oct. 16, 2001

(54) METHOD AND APPARATUS FOR INSPECTING RECORDING MEDIUM FOR DEFECTS

(75) Inventors: Yiping Ma, Layton; Eric R. Peters, Roy; Weimin Pan, Layton; Klinton D. Washburn, Roy, all of UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/268,142

(22) Filed: Mar. 12, 1999

(51) Int. Cl.[7] .................................................. G11C 29/00
(52) U.S. Cl. ............................................................ 714/718
(58) Field of Search ............................... 714/718, 54, 723

(56) References Cited

U.S. PATENT DOCUMENTS

| | | | |
|---|---|---|---|
| 5,247,254 | 9/1993 | Huber et al. ........................ 324/212 |
| 5,751,947 | 5/1998 | Arakawa .......................... 395/185.07 |
| 5,792,947 | 8/1998 | Pogrebinsky et al. .................. 73/105 |

*Primary Examiner*—Phung M. Chung
(74) *Attorney, Agent, or Firm*—Woodcock Washburn Kurtz Mackiewicz & Norris LLP

(57) ABSTRACT

A method and apparatus for detecting defects on a surface of a recording medium in a magnetic disk apparatus. An idling state of the magnetic disk apparatus is detected and a determination is made of the duration that the recording medium has been in use. The presence/absence of defects on the surface of the recording medium is then sequentially detected, responsive to the duration and the idling state, beginning at a start location of the recording medium. Data located at a detected defect is reallocated to a predetermined storage area, and the detected defect is mapped in a defect location map.

34 Claims, 6 Drawing Sheets

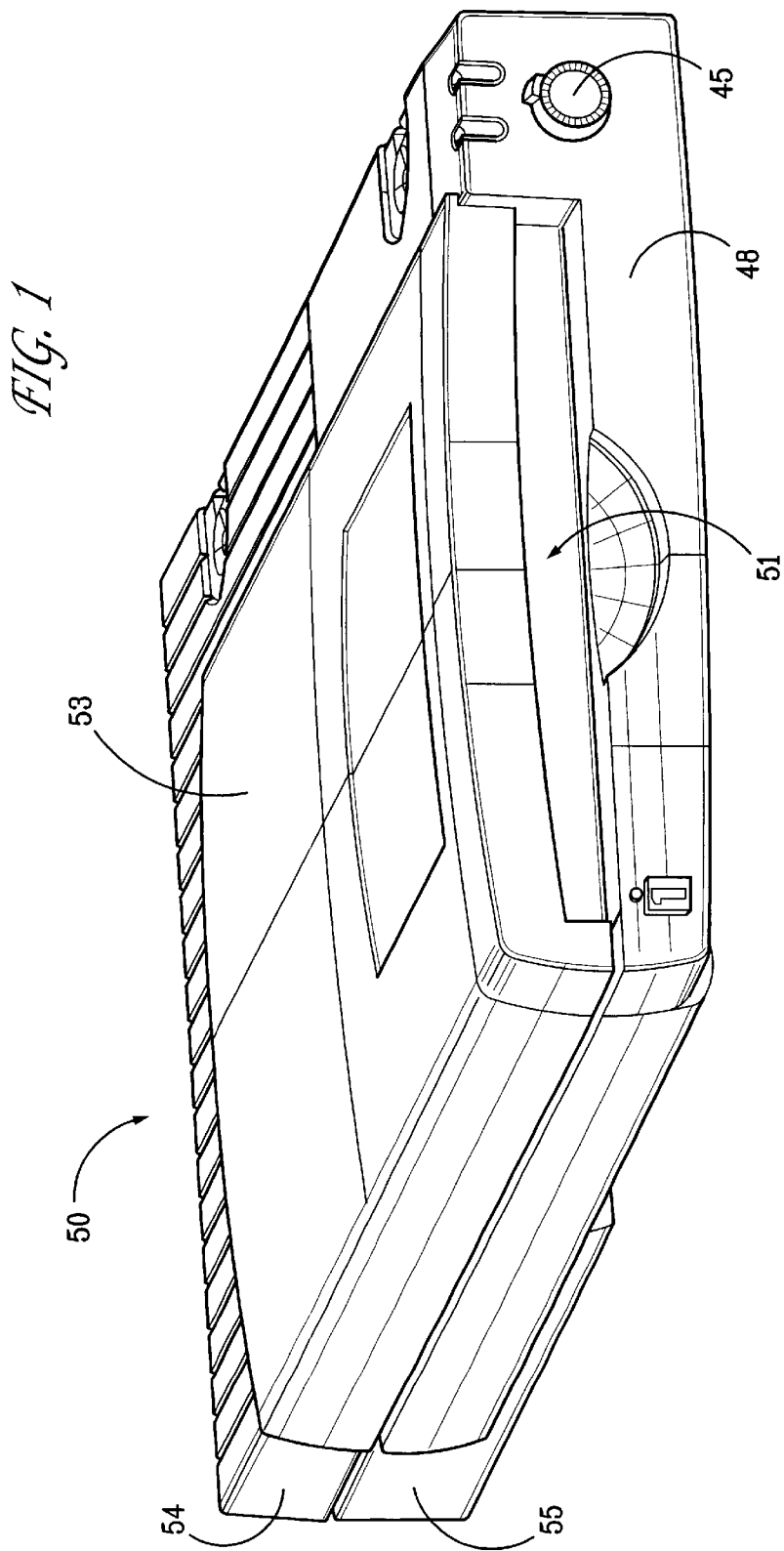

METHOD AND APPARATUS FOR INSPECTING RECORDING MEDIUM FOR DEFECTS

FIELD OF THE INVENTION

The present invention relates in general to a magnetic disk system for reading/writing data from/in a magnetic disk serving as a recording medium. More particularly, the present invention relates to a magnetic disk apparatus having an inspection function of detecting a defect in a magnetic disk and a method of inspecting a recording medium in the magnetic disk apparatus.

BACKGROUND OF THE INVENTION

In magnetic recording technology, desired data is generally recorded by magnetizing the surface of a fixed disk. The disk used in the magnetic disk apparatus inevitably has a rough disk surface and nonuniform magnetic material to some extent. It is desired to improve the density at which information can be recorded and read. The total memory storage capacity or recording density is proportional to the number of tracks and the linear density on the surface of a disk. The number of tracks is dependent upon the width of the tracks.

In order to achieve more narrow tracks, the need to more precisely control the surface conditions of the disks has become increasingly important. A defect or bump on the surface of the disk can degrade or grow, thereby resulting in an unuseable area on the disk. There is a problem of growing defects over the life of a media. A growing defect is a defect on the media that enlarges over time due to physical degradation of the media. The media can become damaged due to dust, scratches, etc. Areas that are not used often may have growing defects due to head movement across the surface during a seek. Moreover, any unwanted contact between the head and magnetic surface can also lead to wear and the accumulation of debris on the disk causing random signal modulations. Typically, during non-use of the drive (e.g., after the drive is idle for 1 second), the heads just sweep or move over media without any reading or writing. This prevents the heads from staying in one location which would otherwise lead to media wear at that location.

Flaws or defects in the disk surface manifest themselves as missing bits or extra bits of data (i.e., single bit errors). Missing bits are reductions in the amplitude of the envelope of the signal, usually over a small number of bits (e.g., 1–4 bits), such that the amplitude falls below a channel-detector clipping level. The number of missing bits observed depends on the setting of the clipping level in the readback channel.

Several methods exist for detecting defects on the surface of a disk. One method involves performing media verification on the disk surface prior to packaging the disk and shipping it to the consumer or end user. However, this technique only locates the defects that exist originally, and will not locate defects that form after shipment of the disk and during usage. Another technique that can be used is for the end user to reformat the entire disk. This will locate any existing defects. However, this technique erases the existing data, so that the data must be saved elsewhere during the reformatting. This is very inconvenient for the user. Furthermore, typically, when data is read from or written to a disk, the media is checked at the critical locations with error correction coding (ECC). In this manner, heavily used areas are checked often for defects. However, areas that are not used frequently are not checked often for defects. Thus, at these locations, growing defects can form and grow without early detection.

Although the art of error detection on media is well developed, there remain some problems inherent in this technology, particularly early detection of growing defects. Therefore, a need exists for a system and method of detecting growing defects that overcomes the drawbacks of the prior art.

SUMMARY OF THE INVENTION

The present invention is directed to a system and method of detecting defects on a surface of a recording medium in a magnetic disk apparatus, comprising: detecting an idling state of the magnetic disk apparatus; determining a duration that the recording medium has been in use; sequentially detecting the presence/absence of defects on the surface of the recording medium, responsive to the duration and the idling state, beginning at a start location of the recording medium; reallocating data located at a detected defect to a predetermined storage area; and mapping the detected defect in a defect location map.

According to one aspect of the present invention, the idling state is detected when the magnetic disk apparatus has been idle for a predetermined time. Preferably, the predetermined time is approximately 1 second.

According to another aspect of the present invention, the predetermined storage area is a predetermined location on the recording medium. Preferably, the start location is a random track/sector on the recording medium.

According to another aspect of the present invention, the duration is a spin count of a number of spin ups or a number of spin downs. Determining the duration comprises retrieving the spin count from a storage means. Preferably, the storage means is a Z-track of the recording medium.

According to another aspect of the present invention, the spin count is reset after the entire surface of the recording medium has been sequentially detected for the presence/absence of defects.

According to another aspect of the present invention, the spin count is incremented either each time the magnetic disk apparatus spins up or spins down.

According to another aspect of the present invention, the duration is compared to a predetermined threshold. The defect detection is begun when the idling state has been detected and when the duration exceeds the predetermined threshold. Preferably, the duration is a number of spin ups or a number of spin downs and the predetermined threshold is about 200. Moreover, the predetermined threshold is programmable.

According to another aspect of the present invention, the sequential detection of the presence/absence of defects comprises error correction coding.

According to further aspects of the invention, the sequential defect detection is interrupted responsive to a command received from a host system. The command is executed and the sequential detection resumes beginning at a random location on the recording medium.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 1 is a perspective view of an exemplary disk drive in which the present invention is embodied;

DESCRIPTION OF EXEMPLARY EMBODIMENTS AND BEST MODE

A method and apparatus for detecting defects on media that solves the above-mentioned problems in the prior art and provides other beneficial features in accordance with the presently preferred exemplary embodiments of the invention will be described below with reference to FIGS. 1–6. Those skilled in the art will readily appreciate that the description given herein with respect to those figures is for explanatory purposes only and is not intended in any way to limit the scope of the invention.

Throughout the description, the invention is described in connection with a removable media disk drive. However, the particular disk drive and cartridge shown only illustrate the operation of the present invention and are not intended as limitations. Aspects of the invention are equally applicable to other disk drives including linear or rotary actuator disk drives, fixed medium drives, and removable medium disk drives as well as differently sized and shaped disks and disk cartridges. Accordingly, the invention should not be limited to the particular drive or disk embodiment shown as the invention contemplates the application to other drive and disk types and configurations. Throughout the following detailed description similar reference numbers refer to similar elements in the figures of the drawings.

A method and apparatus for detecting defects on the surface of a data recording medium is described. In the following description, numerous specific details are set forth in order to provide a thorough understanding of the present invention. However, it will be obvious to one of skill in the art that the invention may be practiced without these specific details. In other instances, well known elements and processing techniques have not been shown or described in particular detail in order to avoid unnecessarily obscuring the present invention. In order to illustrate the need for systems that are capable of accurately and reliably detecting defects on a data recording medium, this discussion will mainly be limited to those needs associated with magnetic recording disks. It will be recognized, however, that such focus is for descriptive purposes only and the apparatus of the present invention are applicable to any of a number of surface media testing applications.

The present invention is directed to a method and apparatus for detecting defects on media of a disk or data storage cartridge. As described in further detail below, a disk drive determines if it has been inactive for a predetermined time and if the disk or data storage cartridge has been used for a predetermined time, and then the disk drive scans the media for defects.

Figure 2A:
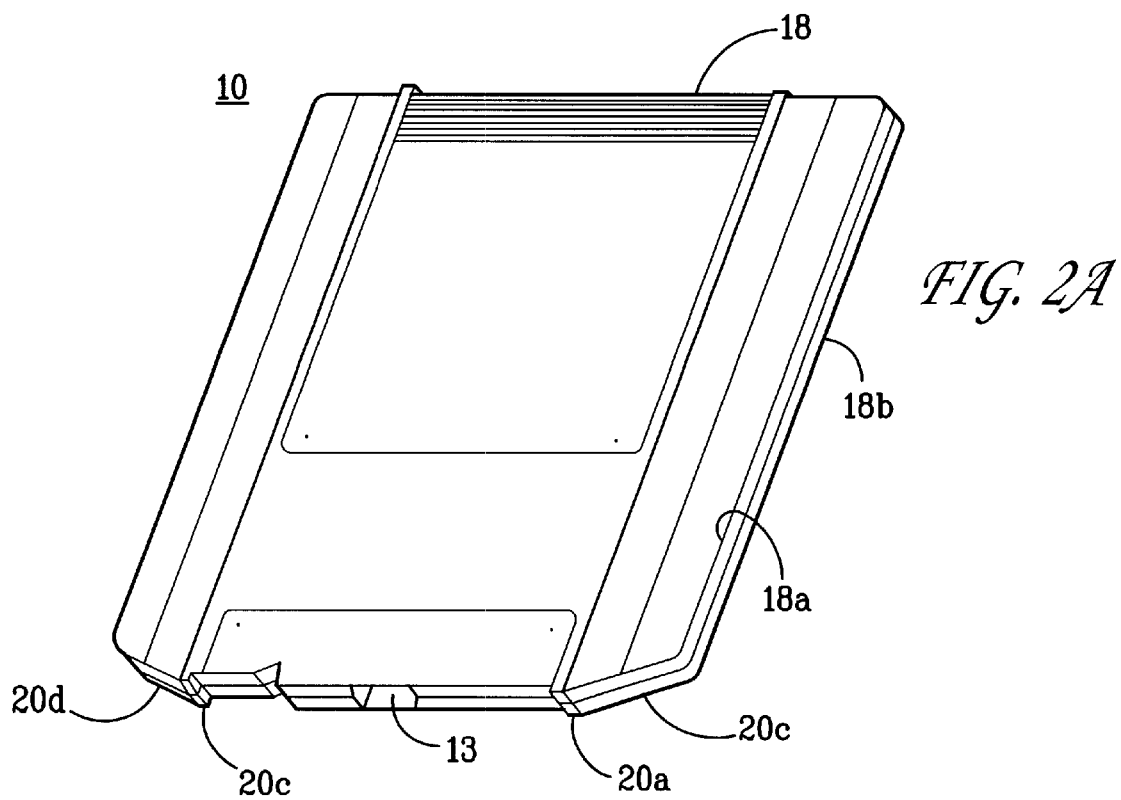
FIG. 2A is a perspective view of a disk cartridge for use with the disk drive of FIG. 1.
Figure 2B:
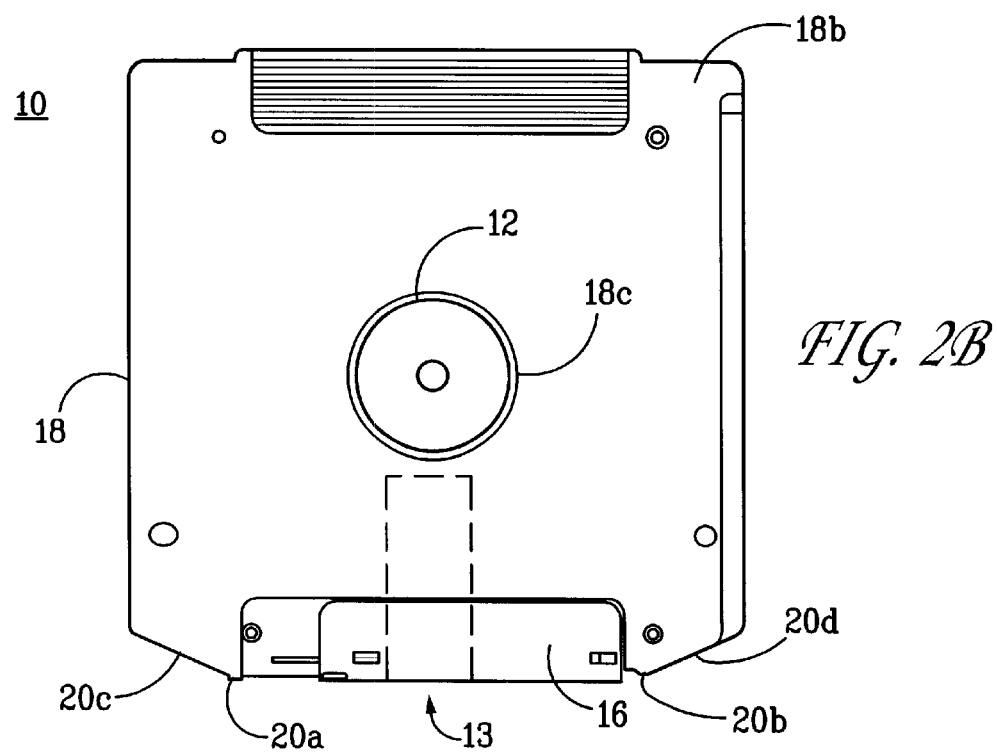
FIG. 2B is a bottom view of the disk cartridge of FIG. 2A.

FIGS. 1, 2A, and 2B are drawings of an exemplary disk drive device 50 and disk 10 for use with the present invention. The drive 50 may be the Iomega ZIP drive which is disclosed and claimed in the U. S. patents identified in U. S. Pat. No. 5,638,228. The drive 50 may be adapted for removable connection to a computer device or may be built-in to a computer device (not shown). The drive 50 may have a protective case, such as protective case 53, having an upper case 54 and a lower case 55, which forms an interior space for accepting disk cartridge 10 or a cartridgeless media, such as an optical compact disk (CD). The upper case 54 and lower case 55 are preferably formed from molded plastic. The lower case 55 has a bottom surface and side surfaces, and upper case 54 is formed so that it covers the top of lower case 55. The width of the case 53 is sized accordingly such that space is available within case 53 to accommodate a disk cartridge as well as a disk drive mechanism and an electronics system. A disk cartridge 10 can be inserted into the disk drive 50 through a horizontal opening 51 in the front panel 48 of the disk drive 40. An eject button 45 is also provided on the front panel 48 for automatically ejecting a disk cartridge from the disk drive 40.

FIGS. 2A and 2B show an exemplary disk cartridge 10 adapted for use in the disk drive 50 of FIG. 1. As shown, the disk cartridge 10 comprises an outer casing 18 having upper and lower shells 18a, 18b that mate to form the casing. A disk-shaped recording medium (shown as element 14 in FIG. 5) is affixed to a hub 12 that is rotatably mounted in the casing 18. An opening 18c on the bottom shell 18b of the casing 18 provides access to the disk hub 12. A head access opening 13 in the front peripheral edge of the disk cartridge 10 provides access to the recording surfaces of the disk by the recording heads of the disk drive. A shutter 16 is provided on the front peripheral edge of the disk cartridge 10 to cover the head access opening 13 when the cartridge is not in use. When the cartridge is inserted into the disk drive, the shutter 16 moves to the side exposing the head access opening 13 and thereby providing the heads of the drive with access to the recording surface of the disk. In the present embodiment, the casing houses a flexible or floppy magnetic disk, however, in other embodiments, the disk may comprise a rigid magnetic disk, a magneto-optical disk or an optical storage medium.

The opposite front corners of the disk cartridge 10 have a non-square shape defined by angled surfaces 20c, 20d that angle away from the front peripheral edge of the cartridge at a predetermined angle. Additionally, a pair of projections 20a, 20b are formed on the front peripheral edge of the cartridge. Each projection 20a, 20b is formed adjacent a respective one of the angled surfaces 20c, 20d at the point where the respective surface 20c, 20d begins to angle away from the plane of the front peripheral edge of the cartridge 10.

Figure 3:
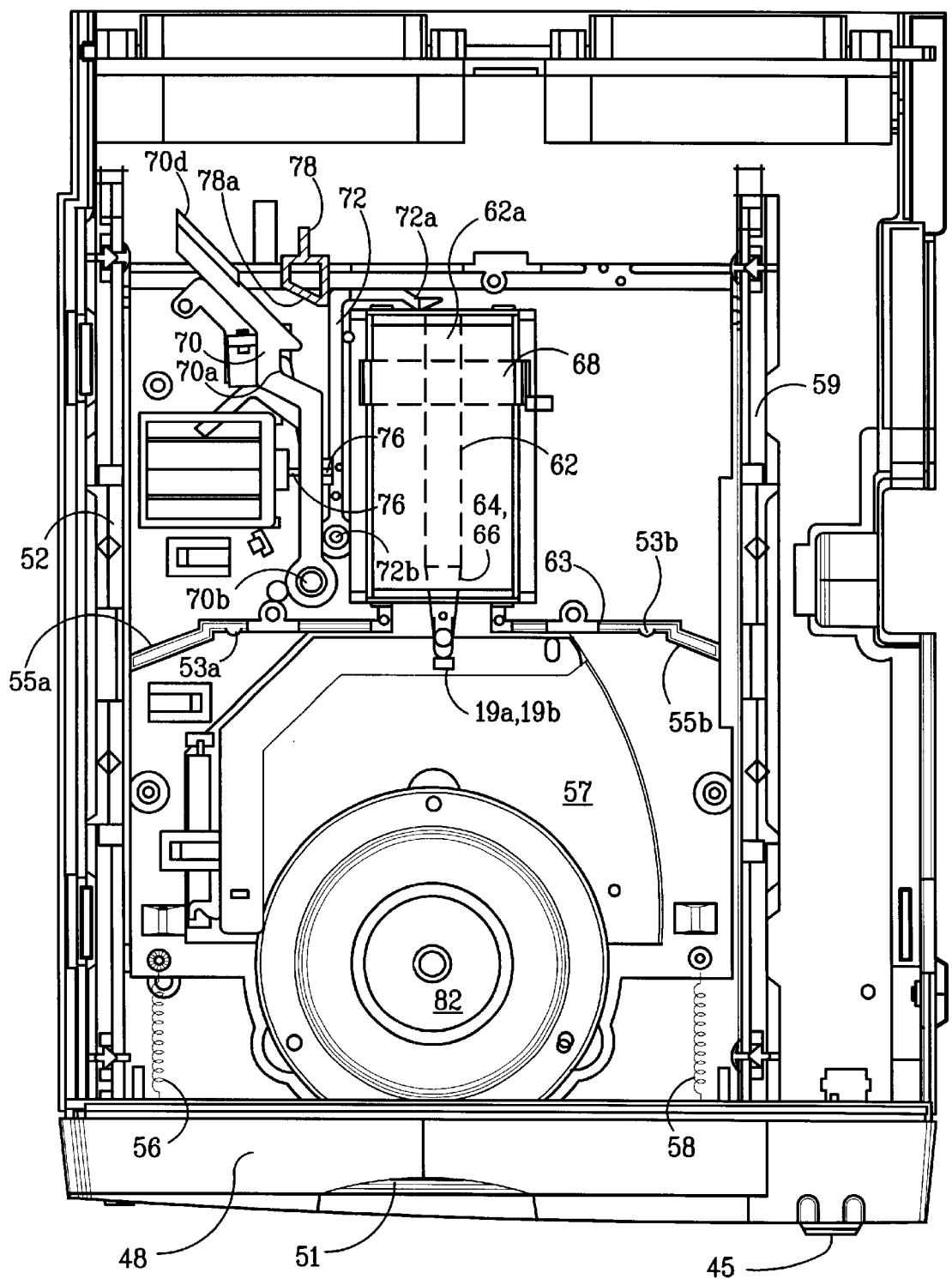
FIG. 3 is a top view of the disk drive of FIG. 1 with a top cover of the device housing removed.

FIG. 3 is a top view of the disk drive 50 of FIG. 1 with the top cover 54 removed. The disk drive 50 comprises an internal platform 57 that slides along opposing side rails 52, 59 between a forward position and a rearward position. A pair of springs 56, 58 bias the platform 57 toward its forward position.

An actuator 60, which in the preferred embodiment comprises a linear actuator, is mounted to the rear of the platform 57. The linear actuator 60 comprises a carriage assembly 62 having two lightweight flexible arms 64, 66. The recording heads 19a, 19b of the disk drive are mounted at the ends of the respective arms 64, 66. A coil 68, which is part of a voice coil motor, is mounted at the opposite end of the carriage 62. The coil 68 interacts with magnets (not shown) to move the carriage linearly so that the heads 19a, 19b can move radially over respective recording surfaces of a disk cartridge inserted into the disk drive. Additional details of the linear actuator 60 are provided in co-pending application Ser. No. 08/324,599, filed Oct. 18, 1994, entitled "Actuator for Data Storage Device", which is incorporated herein by reference.

A raised wall 63 is formed on the platform. The raised wall 63 extends across the width of the platform 57, perpendicularly to the direction of motion of the carriage 62. The raised wall 63 defines an eject member that engages the front peripheral edge of the disk cartridge 10 upon insertion of the disk cartridge into the disk drive. The opposite side edges 55a, 55b of the eject member are angled in the same manner as the opposite front corners 20c, 20d of the disk cartridge 10. Thus, the shape of the eject member mirrors the contour of the forward end face of the cartridge. As further shown, the front surface of the eject member 45 has a pair of projections 53a, 53b positioned near the angled surfaces 55a, 55b.

The disk drive 50 further comprises a spindle motor 82 capable of rotating the recording medium of a disk cartridge at a predetermined operating speed. In the present embodiment, the spindle motor 82 is coupled to the platform 57. As described hereinafter, when a disk cartridge is inserted into the disk drive, the hub 12 of the disk cartridge engages the spindle motor 82 of the disk drive 50 when the platform reaches its rearward position.

As embodied in the disk drive 50 illustrated herein, the disk drive 50 comprises a first movable member movably mounted in the disk drive for performing a respective function. In the embodiment described herein, the first movable member comprises an eject latch lever 70 movably mounted within the disk drive 50. As described hereinafter, the eject latch lever 70 functions to releasably latch the platform 57 in its rearward position. In the present embodiment, the eject latch lever 70 is pivotally mounted on the platform 50 about a rotation shaft 70b. A first spring (not shown) is coupled to the eject latch lever 70 (i.e., first movable member) at the rotation shaft 70b in order to bias the lever 70 in a first direction (e.g., the $X^+$ direction). The eject latch lever 70 has a cutout 70a adapted to releasably engage a latch projection 78 as the platform 57 moves backward into its rearward position. The biasing force of the first spring urges the eject latch lever 70 into this latched position. In the preferred embodiment, the latch projection 78 is formed as part of the top cover 54 (not shown) of the disk drive 50.

Further in accordance with the present embodiment, the disk drive 50 comprises a second movable member movably mounted within the disk drive 50. In the embodiment described herein, the second movable member comprises a head locking lever 72 that is pivotally mounted on the platform 57 about a rotation shaft 72b. As described hereinafter, the head locking lever 72 functions to lock and unlock the carriage 62 of the linear actuator 60. A second spring (not shown) is coupled to the head locking lever 72 (i.e., second movable member) at its rotation shaft 72b to bias the head locking lever 72 in the same direction as the eject latch lever 70 (i.e., the $X^+$ direction). An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 19a, 19b.

A single electro-mechanical device, which in the preferred embodiment comprises a solenoid 74, is mounted on the platform 57 and has a drive shaft 76. When the solenoid 74 is energized by an electrical current, the drive shaft 76 moves in the $X^-$ direction from a normally extended position toward a retracted position. As the drive shaft 76 of the solenoid 74 moves toward its retracted position, an enlarged operating end 76a of the drive shaft 76 engages the first and second movable members (e.g., eject latch and head locking levers 70, 72) in order to pull the members in the $X^-$ direction against the respective biasing forces of the first and second springs.

Figure 4:
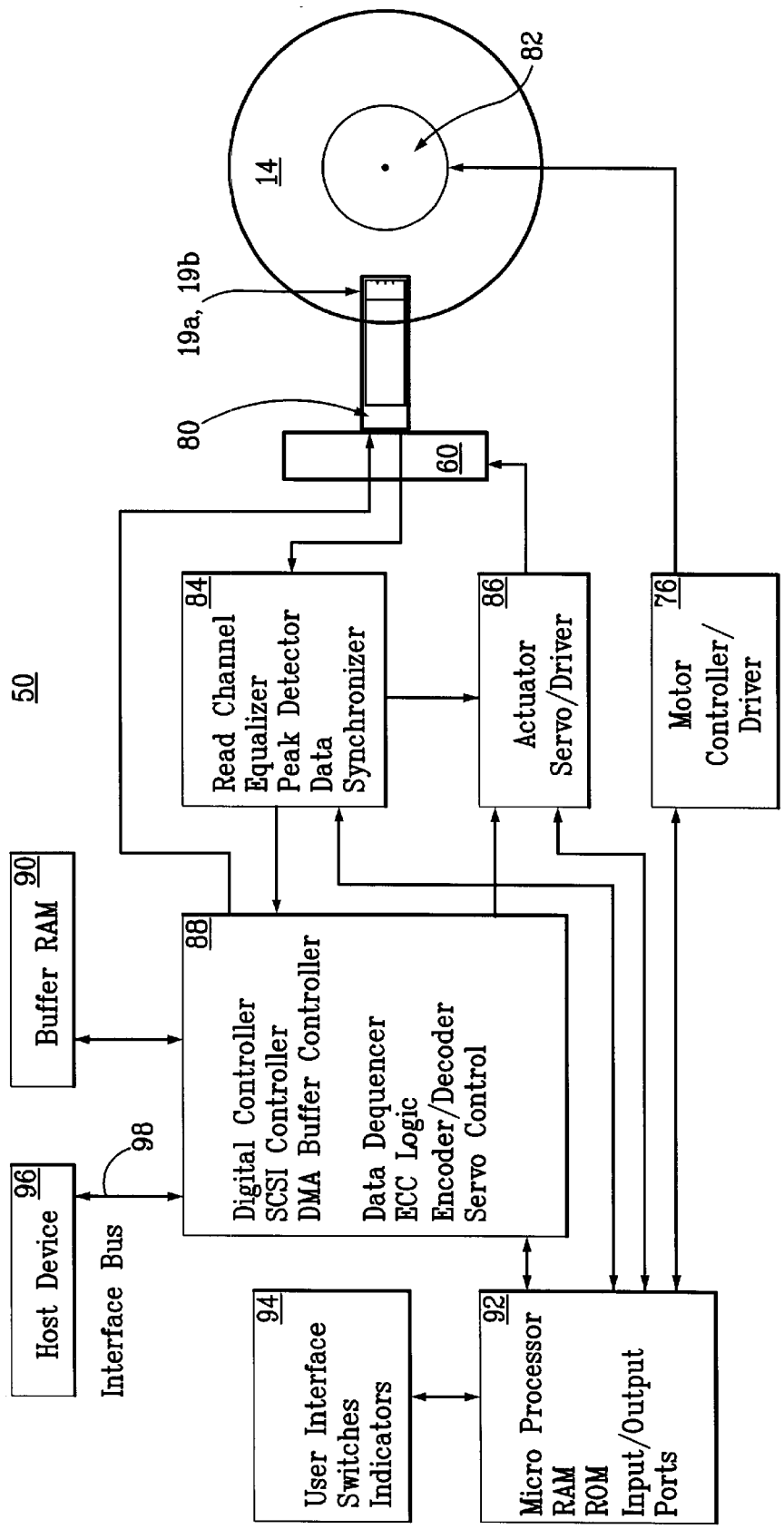
FIG. 4 is a block diagram illustrating further details of the disk drive of FIG. 1.

FIG. 4 is a block diagram of the electronic components of an exemplary disk drive 50 in accordance with the present invention. As shown, the disk drive 50 comprises a spindle motor 82, motor controller/driver 76, read/write heads 19a, 19b, read/write pre-amp 80, read channel 84, actuator 60, actuator servo/driver 86, digital controller 88, random access memory (RAM) buffer 90, microprocessor 92 and user interface components 94. The disk drive 50 connects to a user's host device 96 through an interface bus 98.

The motor controller/driver 76 and spindle motor 82 rotate the storage media of the cartridge 10 at a constant speed, allowing the read/write heads 19a, 19b to "fly" close to the rotating storage media for a stable recording environment.

The read/write pre-amp 80 amplifies the signals picked up by the heads 19a, 19b during read operations and switches current in the heads 19a, 19b during write operations. The read channel 84 shapes the pulses from the pre-amp 80, qualifies the peaks that represent the user data and special information, and generates a clock that is synchronous with the data coming off the storage media.

The actuator servo/driver 86 demodulates servo information recorded on storage media and compensates to position the read/write heads 19a, 19b precisely on a selected track of the data storage media.

The digital controller 88 decodes and error checks the data from the read channel 84 (using error correction coding (ECC)) and stores the data temporarily in a buffer memory. The controller 88 also ensures that data is written to, or read from, the correct track and sector of storage media. The controller 88, when directed by the microprocessor 92, sends data from the buffer 90 to the host device 96, or from the host device 96 to the buffer 90, in accordance with a predefined protocol, such as ATAPI (AT Attachment Packet Interface).

The microprocessor 92 controls and monitors the functions in the drive 50. The program code is preferably stored in a read-only memory (ROM), while a RAM is preferred for storing variables, flags, status information, etc. The microprocessor 92 is responsible, in large part, for controlling the disk drive in accordance with the present invention. A significant function of the microprocessor 92 is to order the "smart sweeping" of the disk after a predetermined idle time and spin count, as described in further detail below. Any suitable microprocessor can be employed, such as, for example, a Motorola 68HC16 microprocessor or an Intel 8032 microprocessor.

Figure 5:
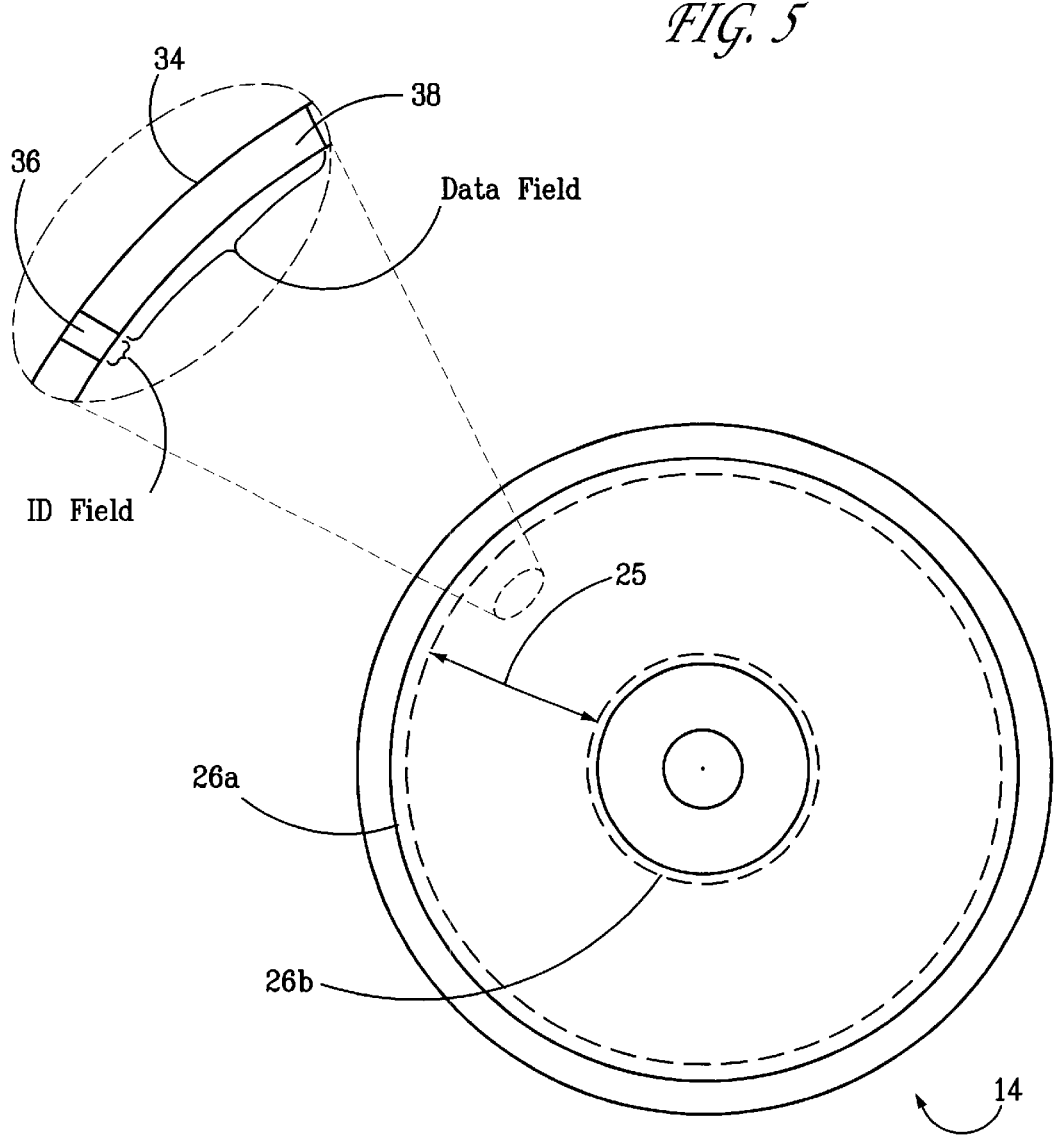
FIG. 5 shows a disk-shaped storage media of the disk cartridge of FIG. 2A containing an exemplary data structure.

Referring now to FIG. 5, an exemplary disk-shaped storage media 14 in accordance with the present invention is depicted. The storage media 14 comprises a disk having a magnetic coating for writing and reading information to and from the storage media 14. Preferably, information can be written on both sides of the storage media 14. While magnetic media is preferred, other media can be employed, and the present invention is by no means limited to use of magnetic storage media. For example, the storage media 14 can be a re-writeable optical storage media or a magnet-optical storage media.

In a preferred embodiment, the storage media 14 has a band of concentric data tracks 25 which can be written to, and read from, a user's host computer device, such as a computer, a digital camera, or the like. The concentric data tracks 25 may have a variety of track densities. In addition to the data tracks 25, preferably there are at least two special information tracks 26a, 26b on each side of the storage media (only one side is shown in FIG. 5), called Z-tracks, that contain information, such as the defect characteristics of that particular storage media. The information contained on these tracks is preferably identical and, in fact, is preferably repeated in at least two separate locations on each track 26a, 26b. This redundancy helps to ensure that the information is available, even if some areas of the storage media 14 become damaged and unreadable.

Each data track in the band of data tracks 25 preferably contains sectors 34 that comprise an ID field 36 and a data field 38. Preferably, the data field 38 comprises 512 bytes; however, in other embodiments, the data field 38 can comprise a different number of bytes. The ID field 36 is used to identify the sector 34 and distinguish it from other sectors in the track.

A sector in which a defect is detected is assigned to another sector. When a defect is encountered, information representing the position of the sector having the defect is stored on the magnetic disk itself (e.g., in the Z-track) and preferably in a memory in the magnetic disk apparatus or disk drive, so as to substitute access to the sector having the defect for access for a substitute sector containing the data.

Figure 6:
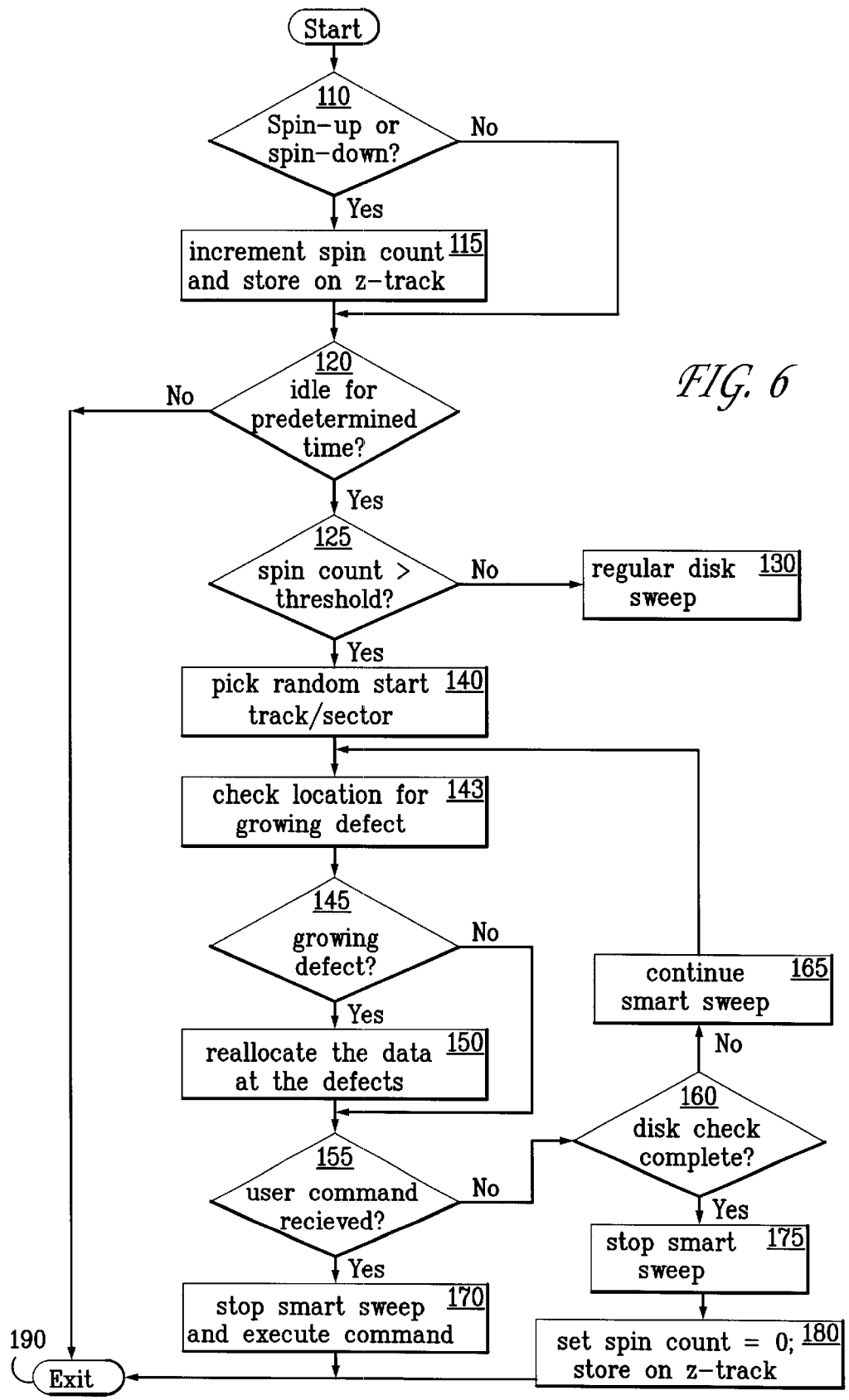
FIG. 6 is a flow diagram illustrating an exemplary method of detecting defects on the media in accordance with the present invention.

FIG. 6 is a flow diagram illustrating an exemplary method of detecting growing defects on the media in accordance with the present invention. As described above, a sweep mode is used in the prior art to move a head across the disk without accessing data. The sweep mode is activated after the drive has not been used for a predetermined time (e.g. a few seconds). In accordance with the present invention, during sweep, a sequential read (without data transfer but with error checking) is performed over all or part of the disk surface to detect any defects on the surface, including those areas that are not frequently checked during read/write of data. Thus, any defects or problems can be noted and/or fixed before data is lost. In other words, if an error is detected, then it is a defect. The data at the defective area is recovered, if possible, and moved to a nondefective portion of the media. A mapping of the defective sector is then performed and stored, for example, in a memory and the magnetic disk itself.

The present invention determines, at step 110, if the media is being spun up or down. If so, a spin count is incremented and stored on a Z-track or elsewhere in memory at step 115. Spin down refers to the state in which the drive goes into a sleep or standby mode, or when the drive is turned off. In these cases, the heads are parked and the drive is spun down. The next time the drive is activated (e.g., the drive is turned on or taken out of sleep or standby mode), the drive is spun up. By maintaining a count of the number of times the drive is spun up or down, an indication of how often the media has been used is obtained. Thus, in accordance with the present invention, the spin count is incremented by an adder each time the media is spun up or each time the media is spun down.

Processing continues at step 120 in which it is determined if the drive has been inactive or idle for a predetermined time. This is determined by an idle state detector which compares a clock to a predetermined time, such as about one second. If the drive has not been inactive for the predetermined time, then the routine exits at step 190, and continues with other drive functions.

If the drive has been inactive for the predetermined time, then the spin count is compared to a threshold at step 125. If the spin count is not greater than the threshold, then a regular disk sweep, such as that described with respect to the prior art, is activated at step 130. If the spin count is greater than the threshold, then a sweep to search for defects is activated (hereinafter also referred to as "smart sweep"). The threshold is preferably about 200 spin ups or spin downs, but can be changed depending on the quality of the media.

At step 140, a random start track/sector is selected and disk checking or verify (ECC) occurs at the track/sector at step 143. In addition to ECC, another method of disk checking or verify involves reading data from the track/sector, writing the read data back to the track/sector, and re-reading the written data. If the re-read data is the same as the initially read data, then the track/sector is not defective. If, however, the re-read data is not the same as the initially read data, then it is determined that the track/sector is defective. A random location is chosen to avoid sweeping the same portions of the disk repeatedly. Smart sweep continues with the track/sector being incremented until either a user interrupts with a command or the entire disk is swept for defects. If a user interrupts with a command, the command is executed, and then if the drive idles for the predetermined threshold amount of time, the smart sweep begins again, at a random location, to likely avoid re-sweeping the portion of the disk that was swept before the interruption. Also, by choosing a random starting location for the smart sweep, no time or memory is wasted in recording the location of the sector that was being checked when the user interrupted with a command.

At step 145 it is determined if any defects have been encountered at the particular location during the disk track/sector checking (ECC checking) and verify. If so and if the data is recoverable, then the data at the defective area is reallocated to a storage area (e.g., another sector on the disk) and a mapping of defective sectors is updated (or other defect restoration processing is performed) at step 150 so that the data is not lost and the defective sector is no longer used.

In one embodiment of the present invention, if a sector is determined to be defective, it is determined if the sector is being used to store data or if it is unused. If the sector is being used, then data is reallocated as described above. If the sector is unused, then no data is reallocated to a new sector, though the defective sector is assigned a reallocation sector. In any event, a mapping of the defective sectors is updated.

If a command has been received (e.g., from a host system that the drive is connected to) since the smart sweep routine began, it is recognized at step 155 and the smart sweep is stopped and the received command is executed at step 170. The routine then exits at step 190. After the command has been executed, processing resumes at step 120. If an idle time is greater than the predetermined time and the spin count is greater than the threshold, then smart sweep continues.

If a command has not been received at step 155, then it is determined at step 160 if the disk checking of the smart sweep is complete. If not, the smart sweep continues at step 145 via step 165. If the disk checking is complete at step 160, then the smart sweep is stopped at step 175, and the spin count is reset to 0 at step 180 and stored on the Z-track or elsewhere in memory. Preferably, the spin count is only reset when the smart sweep sweeps the entire disk. According to another embodiment, the spin count can also be reset after a predetermined number of starts and stops (interruptions)—this will assume that over time, between all the user interruptions, everywhere on the disk will be checked.

The systems for performing defect detection according to the present invention are preferably implemented in firmware, wherein such operations are enabled by programming. However, the system of the present invention can be implemented in general purpose computers using software, or exclusively in special purpose hardware, or in a combination of the two.

The present invention may be employed in any data storage device and is by no means limited to uses described herein. For example, the present invention may be employed in a disk drive that has either a stationary platform, or no platform at all. Additionally, the present invention may be employed in a disk drive that has a rotary actuator as opposed to the linear actuator 60 shown and described herein. Thus, it is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method of detecting defects on a surface of a recording medium in a magnetic disk apparatus, comprising the steps of:

detecting an idling state of the magnetic disk apparatus;

determining a duration that the recording medium has been in use;

sequentially detecting the presence/absence of defects on the surface of the recording medium, responsive to said duration and said idling state, beginning at a start location of the recording medium;

reallocating data located at a detected defect to a predetermined storage area; and mapping said detected defect in a defect location map.

2. The method of claim 1, wherein said idling state is detected when the magnetic disk apparatus has been idle for a predetermined time.

3. The method of claim 2, wherein said predetermined time is approximately 1 second.

4. The method of claim 1, wherein said predetermined storage area is a predetermined location on the recording medium.

5. The method of claim 1, wherein said start location is a random track/sector on the recording medium.

6. The method of claim 1, wherein said duration is a spin count of one of a number of spin ups and a number of spin downs.

7. The method of claim 6, wherein said step of determining said duration comprises the step of retrieving said spin count from a storage means.

8. The method of claim 7, wherein said storage means is a Z-track of the recording medium.

9. The method of claim 6, further comprising the step of resetting said spin count after the entire surface of the recording medium is sequentially detected for the presence/absence of defects.

10. The method of claim 1, further comprising the step of incrementing a spin count each time said magnetic disk apparatus spins up.

11. The method of claim 1, further comprising the step of incrementing a spin count each time said magnetic disk apparatus spins down.

12. The method of claim 1, further comprising the step of comparing said duration to a predetermined threshold, wherein said step of sequentially detecting the presence/absence of defects is begun when said idling state has been detected and when said duration exceeds said predetermined threshold.

13. The method of claim 12, wherein said duration is one of a number of spin ups and a number of spin downs and said predetermined threshold is about 200.

14. The method of claim 12, wherein said predetermined threshold is programmable.

15. The method of claim 1, wherein said step of sequentially detecting the presence/absence of defects comprises error correction coding.

16. The method of claim 1, further comprising the step of interrupting said step of sequentially detecting the presence/absence of defects responsive to a command received from a host system.

17. The method of claim 16, further comprising the steps of:

executing said command; and resuming said step of sequentially detecting the presence/absence of defects after said command has been executed, said sequential detecting beginning at a random location on the recording medium.

18. A system for detecting defects on a surface of a recording medium in a magnetic disk apparatus, comprising:

a detector that detects an idling state of the magnetic disk apparatus;

a counter that determines a duration that the recording medium has been in use;

a defect detector that sequentially detects the presence/absence of defects on the surface of the recording medium, responsive to said duration and said idling state, beginning at a start location of the recording medium;

a storage area for storing data recovered from a detected defect; and a defect location map that maps said detected defect.

19. The system of claim 18, wherein said detector detects said idling state when the magnetic disk apparatus has been idle for a predetermined time.

20. The system of claim 19, wherein said predetermined time is approximately 1 second.

21. The system of claim 18, wherein said predetermined storage area is a predetermined location on the recording medium.

22. The system of claim 18, wherein said start location is a random track/sector on the recording medium.

23. The system of claim 18, wherein said duration is a spin count of one of a number of spin ups and a number of spin downs.

24. The system of claim 23, further comprising means for retrieving said spin count from a storage means.

25. The system of claim 24, wherein said storage means is a Z-track of the recording medium.

26. The system of claim 23, further comprising means for resetting said spin count after the entire surface of the recording medium is sequentially detected for the presence/absence of defects.

27. The system of claim 18, further comprising an adder for incrementing a spin count each time said magnetic disk apparatus spins up.

28. The system of claim 18, further comprising an adder for incrementing a spin count each time said magnetic disk apparatus spins down.

29. The system of claim 18, further comprising a comparator for comparing said duration to a predetermined threshold, wherein said defect detector sequentially begins detecting the presence/absence of defects when said idling state has been detected and when said duration exceeds said predetermined threshold.

30. The system of claim 29, wherein said duration is one of a number of spin ups and a number of spin downs and said predetermined threshold is about 200.

31. The system of claim 29, wherein said predetermined threshold is programmable.

32. The system of claim 18, wherein said defect detector comprises an error correction coder.

33. The system of claim 18, further comprising means for interrupting said defect detector responsive to a command received from a host system.

34. The system of claim 33, further comprising:

means for executing said command; and means for resuming defect detector at a random location on the recording medium after said command has been executed.

* * * * *